Jan. 28, 1947. P. C. McLEMORE ET AL Re. 22,836

APPARATUS FOR FLAME CULTIVATION OF PLANTS

Original Filed Jan. 9, 1943 3 Sheets-Sheet 1

INVENTORS.
Price Chrenleigh McLemore
BY Valdemar Knudsen
Attys.

Jan. 28, 1947. P. C. McLEMORE ET AL Re. 22,836

APPARATUS FOR FLAME CULTIVATION OF PLANTS

Original Filed Jan. 9, 1943 3 Sheets-Sheet 2

INVENTORS.
Price Chrenleigh McLemore,
BY Valdemar Knudsen,
Brown Jackson Boettcher & Dunn
Att'ys.

Jan. 28, 1947. P. C. McLEMORE ET AL Re. 22,836

APPARATUS FOR FLAME CULTIVATION OF PLANTS

Original Filed Jan. 9, 1943 3 Sheets-Sheet 3

INVENTORS.
Price Chenleigh McLemore,
BY Valdemar Knudsen,
Brown, Berman & Bottles, Brown
Attys.

Reissued Jan. 28, 1947

Re. 22,836

UNITED STATES PATENT OFFICE 22,836

APPARATUS FOR FLAME CULTIVATION OF PLANTS

Price Chrenleigh McLemore, Waugh, Ala., and Valdemar Knudsen, Honolulu, Territory of Hawaii, said Knudsen assignor, by mesne assignments, to Flame Cultivation, Incorporated, a corporation of Maryland Original No. 2,391,027, dated December 18, 1945, Serial No. 471,858, January 9, 1943. Application for reissue May 15, 1946, Serial No. 669,742

20 Claims. (Cl. 126—271.2)

The present invention relates to apparatus for practicing flame cultivation of plants, and embodies improvements upon the apparatus disclosed in the following prior applications of Price C. McLemore, one of the present joint applicants: Serial No. 298,870, filed Oct. 11, 1939, issued as Patent No. 2,327,204 on August 17, 1943; Serial No. 364,140, filed Nov. 4, 1940; Serial No. 442,206, filed May 8, 1942.

The method disclosed in the above applications utilizes the principle of subjecting the crop plants and the parasitic weeds and grasses indiscriminately to a flame of substantially predetermined intensity, which flame acts upon the crop plants, weeds and grasses for a substantially predetermined time interval, generally of rather short duration, whereby to destroy or retard the parasitic weeds and grasses without causing appreciable or substantial injury to the crop plants. The time interval over which the crop plants, weeds and grasses are subjected to the flame, and the intensity of the flame, are so proportioned with respect to the type of crop plant, its maturity, the type and maturity of the weeds and grasses, etc., that a relatively brief flaming kills or materially retards the growth of the weeds and grasses, but without causing substantial injury to the crop plant. The operation is preferably performed by mounting hydrocarbon burners on a tractor, and propelling the tractor along the plant rows at a substantially constant preselected speed with the hydrocarbon burners preferably arranged to project their flames down around the bases to the crop plants.

One of the objects of the present invention is to provide an improved mounting for the hydrocarbon burners in such relation to the tractor that the burners are capable of rising and falling relatively to the tractor in traveling over uneven ground along the plant rows. This improved mounting comprises a separate supporting skid for each burner or for each adjacent pair of burners, each supporting skid being capable of independently rising and falling so as to accurately follow the contour of the ground immediately adjacent the plant row being flamed. This insures that the burner flame will always be projected in a substantially fixed relation with respect to the base portion of the plants in the crop rows, neither too high where the flame might injure upper foliage, nor too low where the flame would not be able to operate effectively on weeds and grasses immediately surrounding the base portions of the crop plants.

Another object of the invention is to provide improved power lift mechanism operative to raise the skids and their burner units to elevated position clear of the ground, in order to facilitate turning the tractor around at the ends of the plant rows, or to enable the tractor to be backed more readily.

Other features, objects and advantages of the invention will appear from the following detail description of different preferred embodiments of the invention. In the accompanying drawings illustrating such preferred embodiments:

Figure 1:
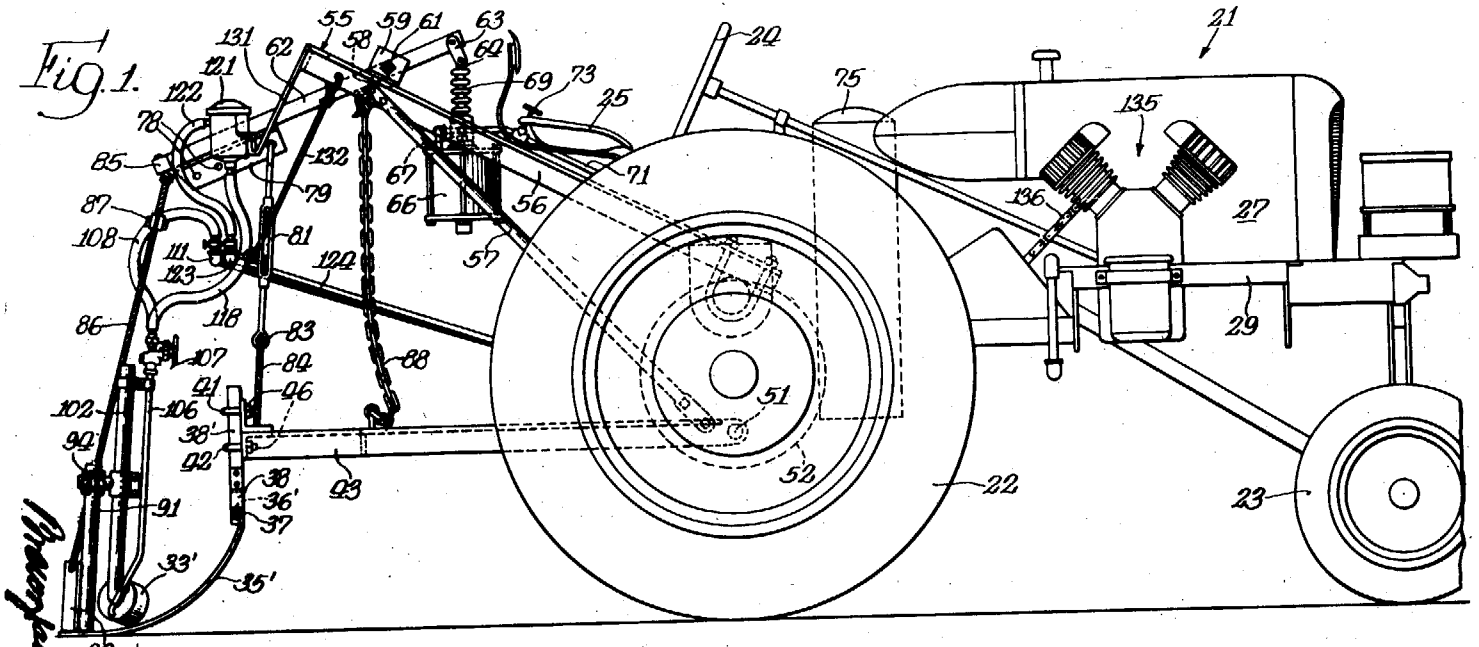
Figure 1 is a side elevational view of one embodiment of our improved flame cultivating apparatus, wherein the ground engaging skids and their burners are connected to the rear of a farm tractor.
Figure 3:
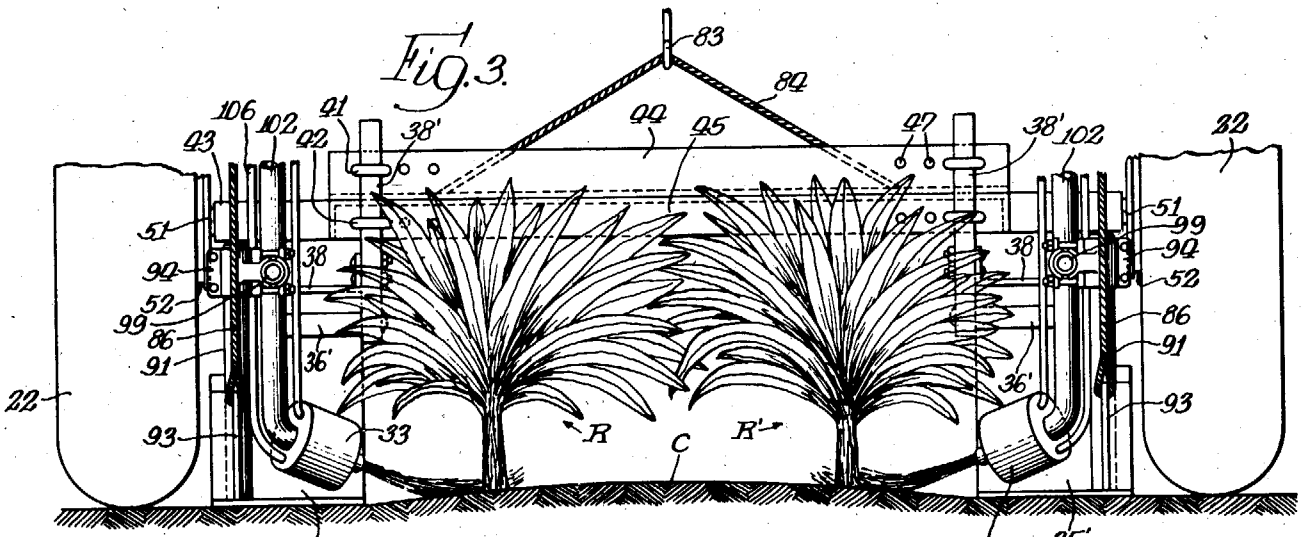
Figure 5:
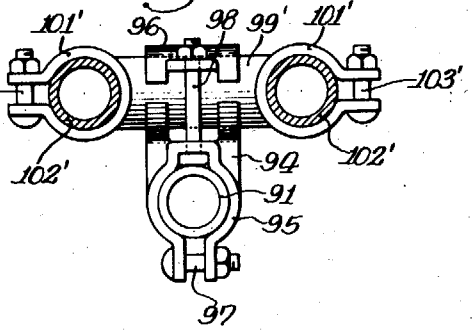
Figure 4:
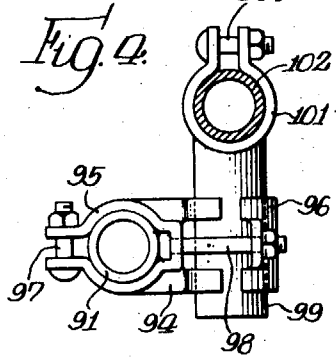

Figure 3 is a rear elevational fragmentary view of the apparatus of Figure 1 illustrating application of the apparatus for cultivating relatively mature crop plants, the upper foliage of which have bridged across and closed out the central space between spaced rows of the plants; and Figures 4 and 5 are enlarged detail sectional views showing the adjustable mounting clamps which mount the burners on the skids.

Referring now to the improved form of apparatus shown in the drawings, the preferred form of vehicle for propelling the burners along the plant rows consists of a farm tractor 21 of any conventional construction, although it will be understood that other cultivating vehicles might be employed, either self-propelled or animal drawn. The tractor 21 is shown as comprising large driving wheels 22 at the rear, and small steering wheels 23 at the front. The front steering wheels 23 are controllable through the conventional steering control wheel 24 disposed adjacent to the driver's seat 25. The vehicle is shown in conjunction with two spaced rows of crops R, R′, such as sugar cane, cotton, corn, legumes, potatoes, tomatoes, ramie, beets, pineapple and the like. In the tractor shown the tread spacing between the front wheels 23 and the tread spacing between the rear wheels 22 is sufficient for spanning the two plant rows. Alternatively, if desired, a tractor of the character described but having its front wheels positioned to run in the center of space C between the plant rows R and R′ may be employed. The front and rear wheels are adapted to tread middles M between adjacent rows of crops R, R′.

The power plant 27 and any conventional clutch and selective speed transmission are mounted in conventional relation on the tractor frame 29, for transmitting a selective speed drive to the rear wheels 22. The selective speed transmission affords a range of three or four selective speeds, in the general range of approximately one half mile per hour to four or five miles per hour. In the preferred form of our invention the tractor is provided with an automatic speed governor which can be set to maintain any desired engine speed, corresponding to a selected tractor speed, as is well known in the art. A power takeoff device is driven by the power plant 27 for actuating the compressor which supplies compressed air to the burners and to the power-lift mechanism, as we shall later describe.

Referring now to the arrangement and mounting of the burners, the mounting rig on the tractor is capable of mounting two central burners 32—32′ and two outwardly disposed burners 33—33′. The burners 32 and 33 are adapted to flame the plant row R, and the burners 32′ and 33′ are adapted to flame the plant row R′. In the cultivation of plants which in the more mature stages of growth have their upper branches, foliage or the like spanning and closing the central space C between plant rows R and R′, the use of the centrally disposed burners 32—32′ is discontinued, and all flaming of the plant rows is then performed by the two lateral burners 33—33′. In this connection, as previously described, the front steering wheels 23 and the rear driving wheels 22 of the tractor are spaced apart sufficiently to travel along outwardly of the crop rows R and R′. A conventional four wheeled tractor having laterally adjustable front wheels is capable of meeting the above requirement necessary for the cultivation of the two plant rows of crops. If desired, special tractors or special implements may be provided capable of spanning two or more beds of rows R, R′, and carrying the required number of burners for flaming the plant rows of these beds.

Figure 2:
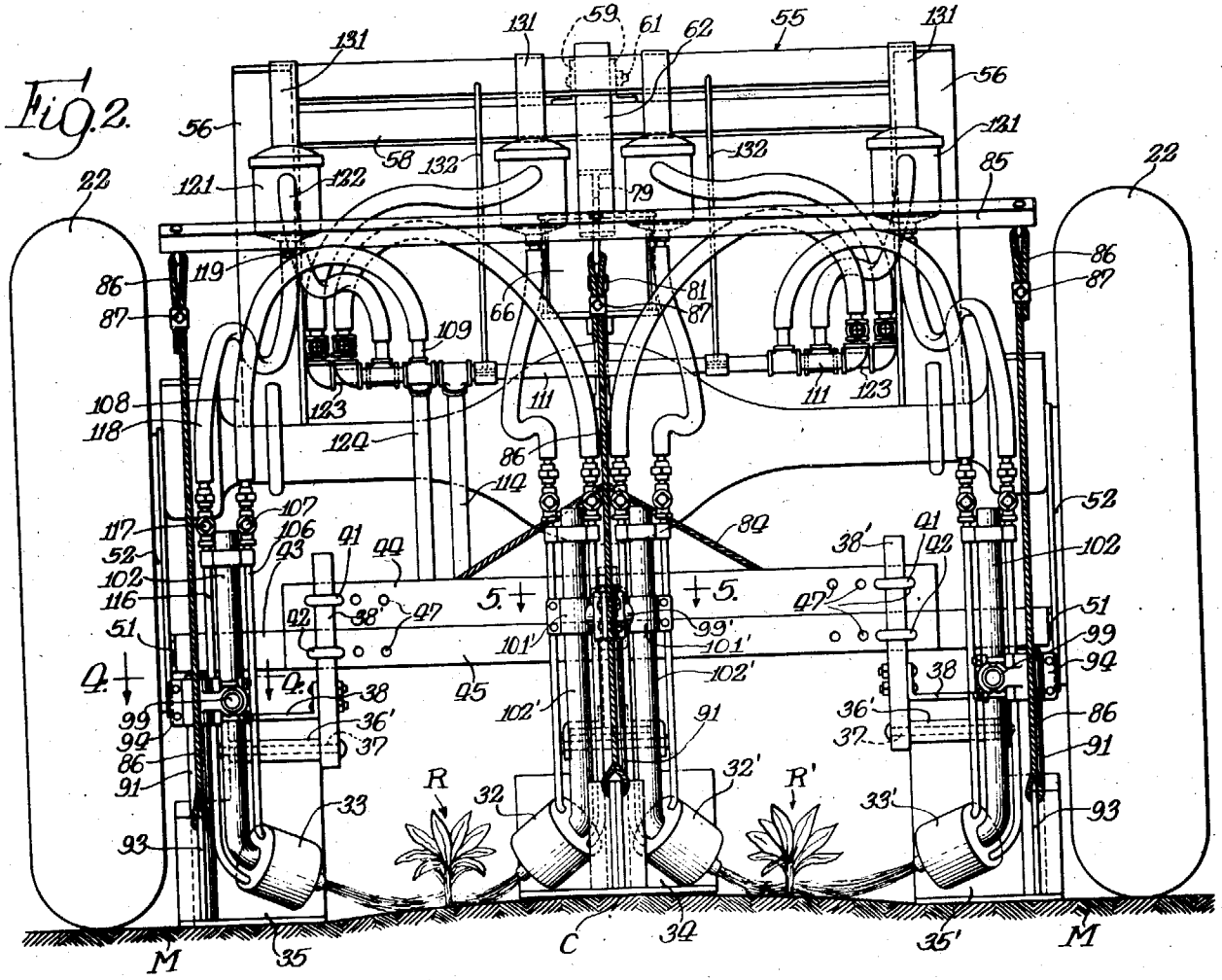
Figure 2 is a rear elevational view on a larger scale of the apparatus of Figure 1 illustrating application of the apparatus in the cultivation of young crop plants.

The central burners 32—32′ are preferably supported on a single central skid 34, although two central skids might be employed, one for each burner. The two lateral burners 33—33′ are supported on lateral skids 35—35′. These skids are adapted to ride on the ground adjacent the crop rows. While a central skid 34 is the preferred form of support for the central burners 32—32′ under most operating conditions, it may be desirable under some conditions to use a wheel or wheels instead of a skid. The several skids are all of substantially the same construction, and accordingly a description of one of these skids will suffice for all. Each skid consists of a flat plate having its forward portion curved upwardly to a pivot eye 36′ rolled in the front edge of the skid (Figure 1). Extending through this pivot eye is a pivot bolt 37 which has its ends mounted in the spaced lower arms of a stirrup bracket 38. The upper shank portion 38′ of each stirrup bracket is adjustably clamped by two U-bolts 41 and 42 to a swinging draft frame 43 carried by the tractor. The U-bolts 41 and 42 extend through bars 44 and 45 forming the transverse rear member of the draft frame 43, and the forward ends of these U-bolts receive nuts 46 bearing against the front sides of said bars. As shown in Figure 2, the bars 44 and 45 are formed with vertically aligned groups of holes 47 for receiving the U-bolts. Thus, by shifting the U-bolts to different holes 47 it is possible to adjust the transverse position of the stirrup bracket to any desired point across the width of the tractor. It will also be noted that by loosening the nuts 46 the stirrup bracket can be slid upwardly or downwardly to any desired point of vertical adjustment within the U-bolts 41 and 42.

In the preferred arrangement, the burners are all disposed in rear of the tractor, and in such arrangement the draft frame 43 has its two side members extending forwardly for pivotal connection at 51 to the frame of the tractor, such as to pivot studs projecting inwardly from gear enclosing drive housings 52 for the rear wheels, where such type of drive is employed. If it should be desired to mount the burners in front of the tractor, such can be accomplished by extending a subframe forwardly from the tractor frame for pivotally supporting the draft frame 43, or the draft frame 43 may have its side members extending rearwardly for pivotal mounting directly on the tractor frame or on brackets secured thereto.

Projecting diagonally upwardly and rearwardly from the tractor frame is a jack-frame 55 which is adapted to support the power lift mechanism that serves to swing the draft frame, skids and burners up to their inoperative positions when traveling to or from the field, turning at the ends of the field, or standing still. This jack-frame 55 comprises two laterally spaced A-frames each consisting of an angle bar 56 and a tubular strut 57, both having their forward lower ends secured to the tractor frame. Extending transversely between the upper portions of the angle bars 56 is a cross-connecting bar 58, to the central portion of which are secured two upwardly extending pivot brackets 59 carrying a transverse pilot bolt 61. Rockably supported on the pivot bolt 61 between the brackets 59 is a lifting beam 62. The forward end of the lifting beam is pivotally connected by a pair of links 63 with the upper end of an air lift plunger rod 64. This plunger rod carries a piston at its lower end which reciprocates vertically within a pneumatic power lift cylinder 66 which is supported from a transverse supporting bar 67 extending between the angle bars 56. An extensible boot or bellows 69 surrounds the upper portion of the piston rod 64 and prevents the entrance of dirt into the cylinder. A compressed air conduit 71 extends from the upper portion of the cylinder 66 to a control valve 73 and thence to a source of compressed air, such as the reservoir 75 (Figure 1). The valve 73 is arranged to be conveniently actuatable by the operator from his position on the tractor seat 25. It will be understood that when the operator opens the control valve 73, compressed air will flow through conduit 71 to cylinder 66 for depressing the piston in the cylinder and thereby rocking the lifting beam 62 in a clockwise direction to lift the draft frame, skids and burners. The reservoir 75 may consist of a single compartment tank with the fuel oil in the lower portion of the tank and the compressed air acting directly on the upper surface of the liquid, or it may consist of a two compartment tank with the fuel oil in one compartment and the compressed air in the other.

The draft frame 43 is adapted to have lifting connection with any one of a series of holes 78 provided in a bar 79 secured to the outer portion of the lifting beam 62. The lifting connection for the draft frame 43 preferably comprises a turnbuckle 81 having its upper end hooked into one of the holes 78, and having an eye 83 at its lower end through which a length of steel cable 84 is passed, the ends of this steel cable being suitably anchored to the draft frame 43. A cross bar 85 is secured at its center to the rear portion of the lifting beam 62 and has its ends disposed above the lateral skids 35—35'. Lengths of steel cable 86 extend downwardly from the ends and centrally of the cross bar 85 to the skids 34 and 35—35', these cables having looped ends secured by adjusting clamps 87. Adjusting the lengths of these cables enables any desired range of lifting movement of the skids to be obtained. When the ground engaging skids are down in their normal ground engaging positions the cables 86 hang somewhat slack so that each skid is free to rise and fall in following undulations in the ground. When it is desired to hold the lifting frame, skids and burners in their raised positions for a substantial period of time, without having to maintain air pressure in the cylinder 66, this can be readily accomplished by extending a chain 88 up from the lifting frame 43 and over the cross connecting bar 58, or through a ring carried by this bar, whereby to take the weight of the lifting frame off of the lifting beam 62.

Referring now to the adjustable mounting of the burners on their individual skids, it will be seen from Figures 2, 4 and 5 that a supporting standard 91 rises from the rear end of each skid 34—35—35'. In this case of the two lateral skids 35—35' this standard preferably rises from the outer rear corner of each of these skids, and in the case of a single central skid 34 this standard preferably rises from the center of the skid. The location of the standard at the outer rear corner of the lateral skids enables the skid to free itself more readily of dirt flowing up over the top of the skid. The lower ends of the lifting cables 86 have attachment to lugs or like fastening devices 93 projecting from the standards. Adjustably clamped to the upper portion of each standard is a mounting clamp or bracket 94 comprising a first clamping section 95 and a second clamping section 96. The first clamping section 95 is of split formation and is adapted to be clamped about the tubular standard 91 by clamping bolts 97, the arrangement being such that the bracket 94 can be adjusted vertically and rotatively in its position on the standard 91. The other clamping section 96 is also split to form two clamping halves which are drawn together by bolts 98. These two clamping halves engage over a short section of tubular pipe 99 which carries a split clamping bracket 101 at its forward end. Extending down through this latter clamping bracket is a tubular burner supporting arm 102. The two clamping halves of the clamping bracket 101 are adapted to be drawn into clamping engagement with the arm 102 by bolts 103. The burner for that particular mounting assembly is secured to the lower end of the tubular arm 102. Figure 5 illustrates the construction used for supporting the central burners. This is similar to the above except that the pipe 99' extends crosswise and is formed with split clamping brackets 101' at both ends for mounting the two tubular arms 102' which carry the two central burners. The arrangement is such that each arm 102' can be adjusted vertically within the clamping bracket 101'—101', and can also be adjusted angularly within this bracket. This enables the height of the burner to be readily adjusted relatively to its supporting skid, and also the direction in which the burner points fore and aft with respect to the plant row. It will also be noted that the short section of pipe 99 or 99' and the clamping bracket 101 or 101'—101' can be rotated angularly about the axis of the pipe 99 or 99' within the bracket section 96, whereby the burner can be swung inwardly or outwardly or fore and aft relatively to the plant rows. Still further, the first clamping section 95 of the adjustment mounting clamp 94 can be raised and lowered along the standard 91 and can also be rotated relatively to this standard so as to afford additional adjustments for positioning the burner or burners. Thus, it will be seen that each burner has a mounting on its supporting skid which is completely universal in character so that the burner can be adjusted in all conceivable directions and angles relatively to the skid. These adjustments also enable the nozzle end of each burner to be adjusted inwardly or outwardly with reference to the inner edge of its respective skid. Thus, if there are large clods of earth in the field, the burner may be set back so that its nozzle end lies inwardly of the inner edge of the skid so that the skid protects the burner from the clods. The upwardly extending end of the tubular support 102 projecting upwardly from the burner serves as a convenient handle for shifting or maneuvering the burner in making any of the aforesaid adjustments.

Each of the burners is preferably of the high pressure atomizing type, such as is illustrated and described in the aforementioned copending application of Price C. McLemore, Serial No. 442,206. The hydrocarbon fuel is fed to each burner under pressure, preferably in the range of from 40 to 60 pounds per square inch, and is projected therefrom in the form of a high pressure jet. A source of compressed air preferably in the neighborhood of 60 pounds pressure is also provided on the tractor, this compressed air being fed to each burner and being projected therefrom in atomizing relation to the jet of fuel. The fuel can be distillate, furnace oil, or any one of a wide range of fuel oils capable of being atomized and burned in the above manner. The high pressure atomizing type of burner is particularly advantageous in effecting flame cultivation of plants because it enables practically any desired length and shape of flame to be obtained, and because it also enables the intensity or temperature of the flame to be adjusted through a relatively wide range. In the cultivation of certain plants it is advantageous to employ a relatively long flame for reaching in under the long overhanging branches or foliage of the crop plant. Extending upwardly from each burner is an air supply pipe 106 for supplying compressed air to the burner. A valve 107 serves to turn on and off the flow of compressed air to the burner, and may also be used to regulate the volume of air supplied to the burner. A hose or flexible conduit 108 extends from the upper end of the air supply pipe 106 to a connection 109 mounted on a transversely extending manifold supply pipe 111. This manifold supply pipe supplies compressed air to all of the burner units, and is fed through pipe 114 from a compressed air storage chamber, which may consist either of a separate compressed air tank or it may consist of the upper chamber area of the fuel storage tank 75.

Also rising from each burner unit is a fuel supply pipe 116 carrying a valve 117 at its upper end which serves as a shut-off valve and which can also be used as a regulating valve for regulating the volume of fuel flowing to the burner unit. Extending from the upper end of the fuel supply pipe 116 is a hose or flexible conduit 118 which has connection at 119 with the outlet port of a fuel oil filter 121. Another hose or flexible conduit 122 connects with the inlet of this filter and extends to a manifold supply pipe 123. The manifold pipe is connected in turn through pipe 124 with the fuel oil tank 75. We preferably employ an individual filter 121 for each burner unit and shorten the line of connections from this filter unit to the burner unit as much as possible so as to minimize the possibility of dirt and other foreign matter entering the flow of fuel to the burner and clogging the burner. The flexible hose connections 108 and 118 permit the free rising and falling movement of each skid and burner in passing over uneven ground, and also accommodates the lifting of the skid and burner to their fully raised, nonfunctioning positions. The filters 121 are secured to supporting brackets 131 extending down from the jack-frame 55. Suspension cables 132 depending from the jack-frame also support the pipes 114 and 124 and also support the manifold supply pipes 111 and 123.

Compressed air is fed to the compressed air reservoir, or to the fuel reservoir, depending upon whether separate reservoirs are employed or whether the fuel and air are both stored in the same tank, from a multiple cylinder compressor 135 which is driven from the tractor engine. A suitable driving connection 136 transmits power from a power take-off on the tractor to the compressor. In the illustrated embodiment, we have shown the compressor as being mounted on the side of the tractor, such being a preferred point of installation on certain makes of tractors, although it will be understood that the compressor might be positioned at the rear of the tractor as disclosed in the aforementioned McLemore application, Serial No. 442,206.

Referring to Figures 2 and 3, each burner is preferably arranged to have its entire flame or the major portion of its flame impinge against the ground on the near side of the plant row, just a few inches short of the plants, and to then fan out over the ground to extend beyond the plant row, thereby completely enveloping each plant stem as the tractor travels along the plant rows. Preferably, the burners are arranged to project their flames substantially straight across the plant rows, although a slight forward inclination may also be desirable. The aforementioned McLemore application Serial No. 442,206 discloses a staggered or offset arrangement of the two burners of each pair, whereby the flame of one burner is ahead of the flame of the other so that the flames do not intersect each other but act in series on each plant, and such arrangement may be incorporated in the present construction. A flat fan-shaped flame may also be employed if desired, as described in said latter McLemore application.

The middles M between beds or plant rows are mechanically cultivated by normal plowing or disking operations, but they may be flame cultivated in lieu of or in addition to mechanical cultivation.

We also contemplate the use of shields under some conditions, which travel alongside the plant rows in elevated positions so as to allow the flames to act under the shields but not to strike the upper foliage of the plants. Such shields are disclosed in the aforementioned McLemore applications Serial Nos. 298,870 and 364,140. Still further, we may employ leaf lifters for lifting the lower leaves or branches of the plants, as disclosed in the aforementioned McLemore application Serial No. 442,206.

While we have illustrated and described what we regard to be the preferred embodiments of the invention, nevertheless it will be understood that such are merely exemplary and that various modifications and rearrangements may be made therein without departing from the essence of the invention.

We claim:

1. In a flame cultivator adapted to cultivate row crops by the flame method, the combination of a vehicle having ground engaging wheels for supporting the vehicle, a plurality of vertically swinging ground engaging skids pivotally connected to said vehicle on substantially horizontal transverse pivot axes and extending rearwardly from said pivot axes, whereby in the operation of the vehicle said skids slide along the ground in direct contact therewith and are free to rise and fall relatively to the vehicle in passing over uneven ground, a pair of burners carried by said skids upon opposite sides of an intermediate vertical plane which extends longitudinally of the vehicle and which intermediate vertical plane is adapted to coincide substantially with the crop row in the operation of the vehicle, each of said burners being directed diagonally downwardly in a direction substantially at right angles to said intermediate vertical plane for causing its flame to strike the ground at a point short of the line of intersection of the plane and the ground, said burners comprising means for projecting a relatively long otherwise unconfined flame which spreads along the ground and floods across the intersection of the plane and the ground for impinging directly against the weeds and the plants in the plant row, lifting mechanism operative to swing said skids and burners substantially vertically to raise and lower said burners, a fuel tank on said vehicle, and supply connections for conducting the fuel from said tank to said burners.

2. In a flame cultivator adapted to cultivate row crops by a flame method, the combination of a wheeled vehicle adapted to travel along a plant row, a plurality of vertically swinging ground engaging skids pivotally connected to said vehicle, a pair of burners carried by said skids upon opposite sides of an intermediate vertical plane which extends longitudinally of the vehicle and which intermediate vertical plane is adapted to coincide substantially with the crop row in the operation of the vehicle, each of said burners being directed diagonally down toward the surface of the supporting ground short of the line of intersection of the plane and the ground, said burners comprising means for projecting a volume of flame which spreads along the ground and floods across the intersection of the plane and the ground for impinging directly against the weeds and the plants in the plant row, said skids having free rising and falling movement relatively to the vehicle and to each other in passing over uneven ground so as to accurately maintain said burners at a substantially constant height above the ground, lifting mechanism operative to lift said skids and burners to inoperative positions, a fuel tank on said vehicle, and supply connections for conducting the fuel from said tank to said burners.

3. In a flame cultivator adapted to cultivate row crops by a flame method, the combination of a wheeled vehicle adapted to travel along a plant row, a plurality of vertically swinging ground engaging skids pivotally connected to said vehicle, a pair of burners carried by said skids upon opposite sides of an intermediate vertical plane which extends longitudinally of the vehicle and which intermediate vertical plane is adapted to coincide substantially with the crop row in the operation of the vehicle, each of said burners being directed diagonally down toward the surface of the supporting ground short of the line of intersection of the plane and the ground, said burners comprising means for projecting a volume of flame which spreads along the ground and floods across the intersection of the plane and the ground for impinging directly against the weeds and the plants in the plant row, said skids having free rising and falling movement relatively to the vehicle and to each other in passing over uneven ground so as to accurately maintain said burners at a substantially constant height above the ground, and lifting mechanism operative to lift said skids and burners to inoperative position.

4. In a flame cultivator adapted to cultivate row crops by a flame method, the combination of a wheeled vehicle adapted to travel along a plant row, a plurality of vertically swinging ground engaging skids pivotally connected to said vehicle, a pair of burners carried by said skids upon opposite sides of an intermediate vertical plane which extends longitudinally of the vehicle and which intermediate vertical plane is adapted to coincide substantially with the crop row in the operation of the vehicle, each of said burners being directed diagonally down toward the surface of the supporting ground short of the line of intersection of the plane and the ground, said burners comprising means for projecting a volume of flame which spreads along the ground and floods across the intersection of the plane and the ground for impinging directly against the weeds and the plants in the plant row, said skids having free rising and falling movement relatively to the vehicle and to each other in passing over uneven ground so as to accurately maintain said burners at a substantially constant height above the ground, a fuel tank on said vehicle, and supply connections for conducting the fuel from said tank to said burners.

5. In a flame cultivator adapted to cultivate row crops by a flame method, the combination of a wheeled vehicle adapted to travel along a plant row, a draft frame pivotally connected with said vehicle, a plurality of mounting skids, draft pivots pivotally connecting said mounting skids with said draft frame, said mounting skids being adapted to slide along the surface of the ground on opposite sides of the plant row, burners mounted on said mounting skids substantially crosswise thereof and adapted to project relatively long unobstructed flames substantially crosswise of the plant row and entirely through and beyond the plant row for direct impingement against weeds in the plant row, and lifting mechanism operative to lift said mounting skids and their burners to inoperative positions with the skids raised out of contact with the ground, said lifting mechanism also including means to lift said draft frame and draft pivots when said mounting skids are lifted.

6. In a flame cultivator adapted to cultivate row crops by a flame method, the combination of a wheeled vehicle adapted to travel along a plant row, a draft frame pivotally connected at its front end with said vehicle, a plurality of mounting skids extending rearwardly from said frame, draft pivots pivotally connecting the forward portions of said mounting skids with said draft frame, said mounting skids being adapted to slide along the ground on opposite sides of the plant row, burners mounted on said mounting skids substantially crosswise thereof and adapted to project relatively long unobstructed flames substantially crosswise of the plant row and entirely through and beyond the plant row for direct impingement against weeds in the plant row, and lifting mechanism operative to raise the rear end of said draft frame and said mounting skids to inoperative positions, said lifting mechanism including flexible connections to said mounting skids whereby said mounting skids are free to rise and fall relatively to each other and to said draft frame in sliding over uneven ground without being hindered in such rising and falling movement by the lifting mechanism.

7. In a flame cultivator adapted to cultivate row crops by a flame method, the combination of a wheeled vehicle adapted to travel along a plant row, a plurality of mounting skids adapted to slide along the ground along opposite sides of the plant row, draft pivots pivotally connecting said mounting skids with said vehicle whereby said skids can rise and fall independently of each other and of said vehicle in passing over uneven ground, burners mounted on said skids substantially crosswise thereof and adapted to project relatively long unobstructed flames substantially crosswise of the plant row and entirely through and beyond the plant row for direct impingement against weeds in the plant row, and power lift mechanism operative to lift said mounting skids and their burners to inoperative positions with said skids out of contact with the ground, said power lift mechanism comprising a relatively movable cylinder member and piston member, means for admitting fluid under pressure to said cylinder member, rocker means supported by said vehicle approximately above said skids, one of said power members being operatively connected to actuate said rocker means when fluid under pressure is admitted to said cylinder member, and flexible connections extending down from said rocker means to said mounting skids for raising said skids to their inoperative positions, the flexibility of said latter connections permitting said mounting skids to rise and fall independently of each other and independently of said power lift mechanism in passing over uneven ground.

8. In a cultivator adapted to cultivate row crops by the flame method, the combination of a wheeled vehicle adapted to travel along the rows, a free floating ground engaging skid connected with said vehicle for sliding along the ground adjacent to a plant row, a standard rising from said skid, an adjustable clamp engaging over said standard, and a burner carried by said adjustable clamp directed diagonally downwardly substantially crosswise of said skid for causing its flame to strike the ground short of the plant row and to then flood through the plant row substantially in contact with the ground, said clamp being adjustable to different vertical positions along said standard and to different angular positions about said standard for adjusting the burner relatively to the plant row.

9. In a cultivator adapted to cultivate row crops by the flame method, the combination of a wheeled vehicle adapted to travel along the rows, burners propelled by said vehicle adapted to project flames across the rows, free floating mounting skids for carrying said burners, a draft frame pivotally connected with said vehicle for vertical swinging movement, and adjustable connecting means for movably connecting said skids with said draft frame whereby said skids can rise and fall relatively to each other, said adjustable connecting means being shiftable to different positions crosswise of said draft frame for enabling said skids to be shifted transversely relatively to each other to different positions crosswise of the vehicle.

10. In a flame cultivator adapted to cultivate row crops by the flame method, the combination of a vehicle having ground engaging wheels for supporting the vehicle, a plurality of vertically swinging ground engaging skids pivotally connected to said vehicle on substantially horizontal transverse pivot axes and extending rearwardly from said pivot axes, whereby in the operation of the vehicle said skids slide along the ground in direct contact therewith and are free to raise and fall relatively to the vehicle in passing over uneven ground, burners mounted on said skids substantially crosswise thereof and adapted to project relatively long flames diagonally downwardly against the ground substantially crosswise of a plant row to pass entirely through and beyond the plant row for direct impingement against weeds in the plant row, said burners being so mounted on said skids that said skids accurately predetermine the height of the burners with respect to variations of ground level adjacent the plant row but without obstructing the projection of the flames crosswise of the plant row, and lifting mechanism operative to raise said skids and burners for turning at the ends of the rows and for traveling to and from the field.

11. In apparatus of the class described for use on row crops, the combination of mounting means for mounting on a wheeled vehicle adapted to travel along the plant rows, burners for projecting flames across said plant rows, ground engaging supports for said burners, a draft frame movably mounted on said mounting means, adjustable pivotal connections between said ground engaging supports and said draft frame permitting free vertical swinging of each ground engaging support relative to said draft frame and also enabling said ground engaging supports to be adjusted vertically relatively to said frame, and lift mechanism for raising and lowering said ground engaging supports and said draft frame relatively to said mounting means.

12. In a flame cultivator adapted to cultivate row crops by a flame method, the combination of mounting means for mounting on a wheeled vehicle adapted to travel along a plant row, a draft frame pivotally connected with said mounting means, a plurality of mounting skids, draft pivots pivotally connecting said mounting skids with said draft frame, said mounting skids being adapted to slide along the surface of the ground on opposite sides of the plant row, burners mounted on said mounting skids substantially crosswise thereof and adapted to project relatively long unobstructed flames substantially crosswise of the plant row and entirely through and beyond the plant row for direct impingement against weeds in the plant row, and lifting mechanism operative to lift said mounting skids and their burners to inoperative positions with the skids raised out of contact with the ground, said lifting mechanism also including means to lift said draft frame and draft pivots when said mounting skids are lifted.

13. In a flame cultivator adapted to cultivate row crops by a flame method, the combination of mounting means for mounting on a wheeled vehicle adapted to travel along a plant row, a draft frame adapted to be connected pivotally at its front end with said mounting means, a plurality of mounting skids extending rearwardly from said frame, draft pivots pivotally connecting the forward portions of said mounting skids with said draft frame, said mounting skids being adapted to slide along the ground on opposite sides of the plant row, burners mounted on said mounting skids substantially crosswise thereof and adapted to project relatively long unobstructed flames substantially crosswise of the plant row and entirely through and beyond the plant row for direct impingement against weeds in the plant row, and lifting mechanism operative to raise the rear end of said draft frame and said mounting skids to inoperative positions, said lifting mechanism including flexible connections to said mounting skids whereby said mounting skids are free to rise and fall relatively to each other and to said draft frame in sliding over uneven ground without being hindered in such rising and falling movement by the lifting mechanism.

14. In a cultivator adapted to cultivate row crops by the flame method, the combination of mounting means for mounting on a wheeled vehicle adapted to travel along the rows, a free floating ground engaging skid connected with said mounting means for sliding along the ground adjacent to a plant row, a standard rising from said skid, an adjustable clamp engaging over said standard, and a burner carried by said adjustable clamp directed diagonally downwardly substantially crosswise of said skid for causing its flame to strike the ground short of the plant row and to then flood through the plant row substantially in contact with the ground, said clamp being adjustable to different vertical positions along said standard and to different angular positions about said standard for adjusting the burner relatively to the plant row.

15. In a cultivator adapted to cultivate row crops by the flame method, the combination of mounting means for mounting on a wheeled vehicle adapted to travel along the plant rows, burners adapted to project flames across the rows, free floating mounting skids for carrying said burners, a draft frame pivotally connected with said mounting means for vertical swinging movement, and adjustable connecting means for movably connecting said skids with said draft frame whereby said skids can rise and fall relatively to each other, said adjustable connecting means being shiftable to different positions crosswise of said draft frame for enabling said skids to be shifted transversely relatively to each other to different positions crosswise of the intended direction of movement of said support means.

16. In a flame cultivator adapted to cultivate row crops by the flame method, the combination of mounting means for mounting on a vehicle having ground engaging wheels for supporting the vehicle of a plurality of vertically swinging ground engaging skids pivotally connected to said mounting means on substantially horizontal transverse pivot axes and extending rearwardly from said pivot axes, whereby in the intended movement of said mounting means said skids slide along the ground in direct contact therewith and are free to rise and fall relatively to said mounting means in passing over uneven ground, burners mounted on said skids substantially crosswise thereof and adapted to project relatively long flames diagonally downwardly against the ground substantially crosswise of a plant row to pass entirely through and beyond the plant row for direct impingement against weeds in the plant row, said burners being so mounted on said skids that said skids accurately predetermine the height of the burners with respect to variations of ground level adjacent the plant row but without obstructing the projection of the flames crosswise of the plant row, and lifting mechanism operative to raise said skids and burners for turning at the ends of the rows and for traveling to and from the field.

17. In a cultivator adapted to cultivate row crops by a flame method, the combination of mounting means for mounting on a wheeled vehicle adapted to travel along a plant row, a plurality of vertically swinging ground engaging skids pivotally connected to said mounting means, a pair of burners mounted on each intermediate skid and a single burner mounted on each of the outside skids substantially crosswise thereof and directed diagonally down toward the surface of the ground, said burners comprising means for projecting relatively long flames which spread along the ground and flood transversely through and beyond the plant row, said burners being mounted on said skids so that said burners are positioned substantially in the same transverse plane with the point of sliding contact of the skid with the ground whereby the skids accurately predetermine the height of the burners with respect to variations of ground level adjacent the plant row but without obstructing the projection of the flames crosswise of the plant row, draft means for pivotally connecting the forward portions of said skids with said mounting means whereby in the intended movement thereof said skids can have free rising and falling movement relatively to said mounting means and to each other in passing over uneven ground so as to accurately maintain said burners at a substantially constant height with respect to the plants in the plant row, a fuel tank, and supply connections for conducting the fuel from said tank to said burners.

18. A flame cultivator implement comprising, a swingable arm having a pivot at one end and a ground engaging skid portion at its other end, a burner support fastened to said other end of said arm and having a vertically extending clamp portion, and a substantially horizontal burner carrying stem clamped to said clamp portion of the burner support, and a burner carried on said stem and directed transversely of said arm diagonally downwardly.

19. In apparatus of the class described for use on row crops, the combination of a wheeled vehicle adapted to travel along the plant rows, burners propelled by said vehicle for projecting flames across said plant rows, ground engaging supports for said burners, a draft frame movably mounted on said vehicle, adjustable pivotal connections between said ground engaging supports and said draft frame permitting free vertical swinging of each ground engaging support relatively to said draft frame and also enabling said ground engaging supports to be adjusted vertically relatively to said frame, and lift mechanism for raising and lowering said ground engaging supports and said draft frame relatively to said vehicle.

20. In a flame cultivator adapted to cultivate row crops by a flame method, the combination of a wheeled vehicle adapted to travel along a plant row, a plurality of vertically swinging ground engaging skids pivotally connected to said vehicle, a pair of burners mounted on each intermediate skid and a single burner mounted on each of the outside skids substantially crosswise thereof and directed diagonally down toward the surface of the ground, said burners comprising means for projecting relatively long flames which spread along the ground and flood transversely through and beyond the plant row for impinging directly against weeds in the plant row, said burners being mounted on said skids so that said burners are positioned substantially in the same transverse plane with the point of sliding contact of the skid with the ground whereby the skids accurately predetermine the height of the burners with respect to variations of ground level adjacent the plant row but without obstructing the projection of the flames crosswise of the plant row, draft means pivotally connecting the forward portions of said skids with said vehicle whereby in the operation of the vehicle said skids can have free rising and falling movement relatively to the vehicle and to each other in passing over uneven ground so as to accurately maintain said burners at a substantially constant height with respect to the plants in the plant row, a fuel tank on said vehicle, and supply connections for conducting the fuel from said tank to said burners.

PRICE CHRENLEIGH McLEMORE.
VALDEMAR KNUDSEN.